United States Patent Office 3,354,854
Patented Nov. 28, 1967

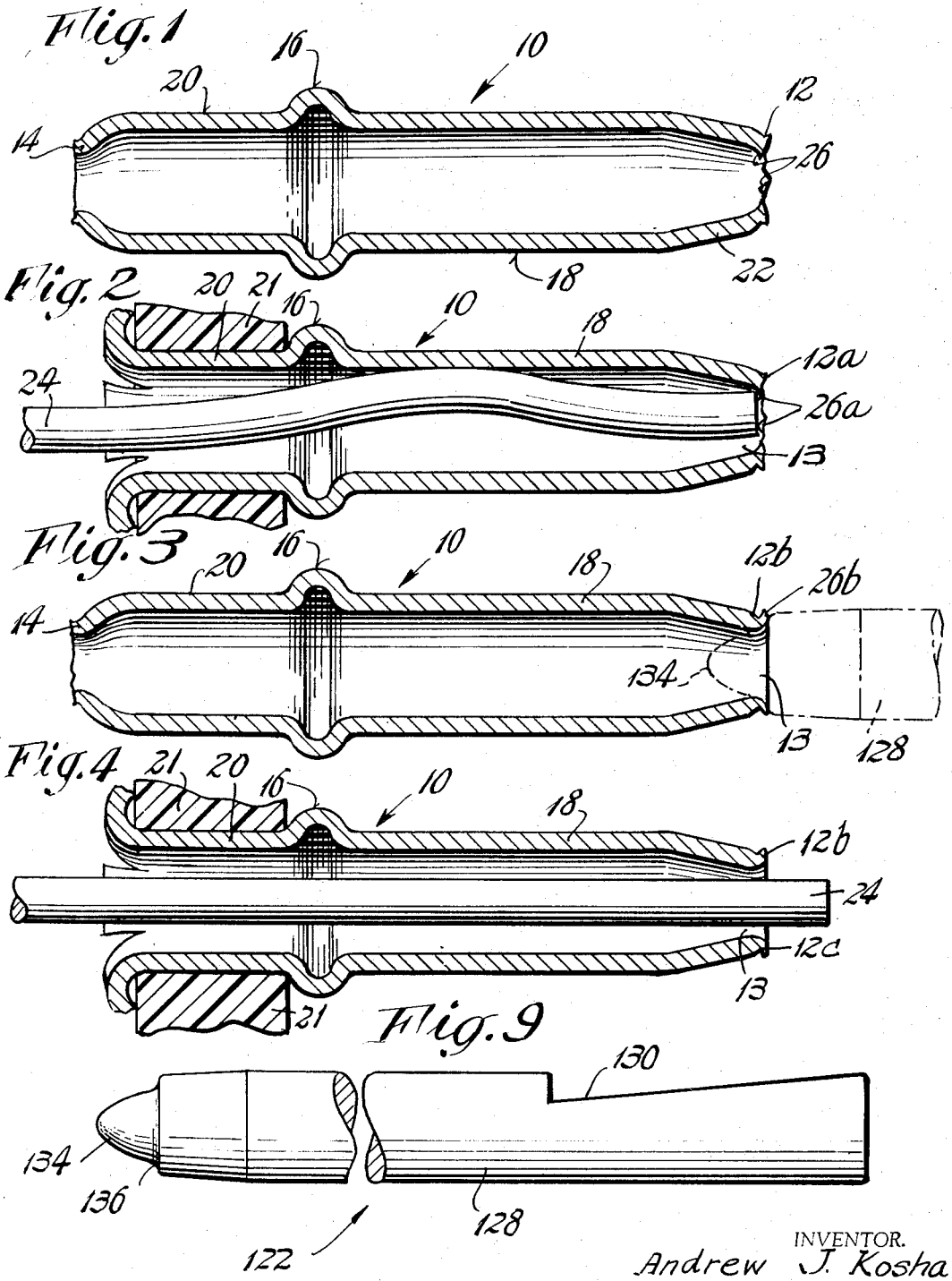

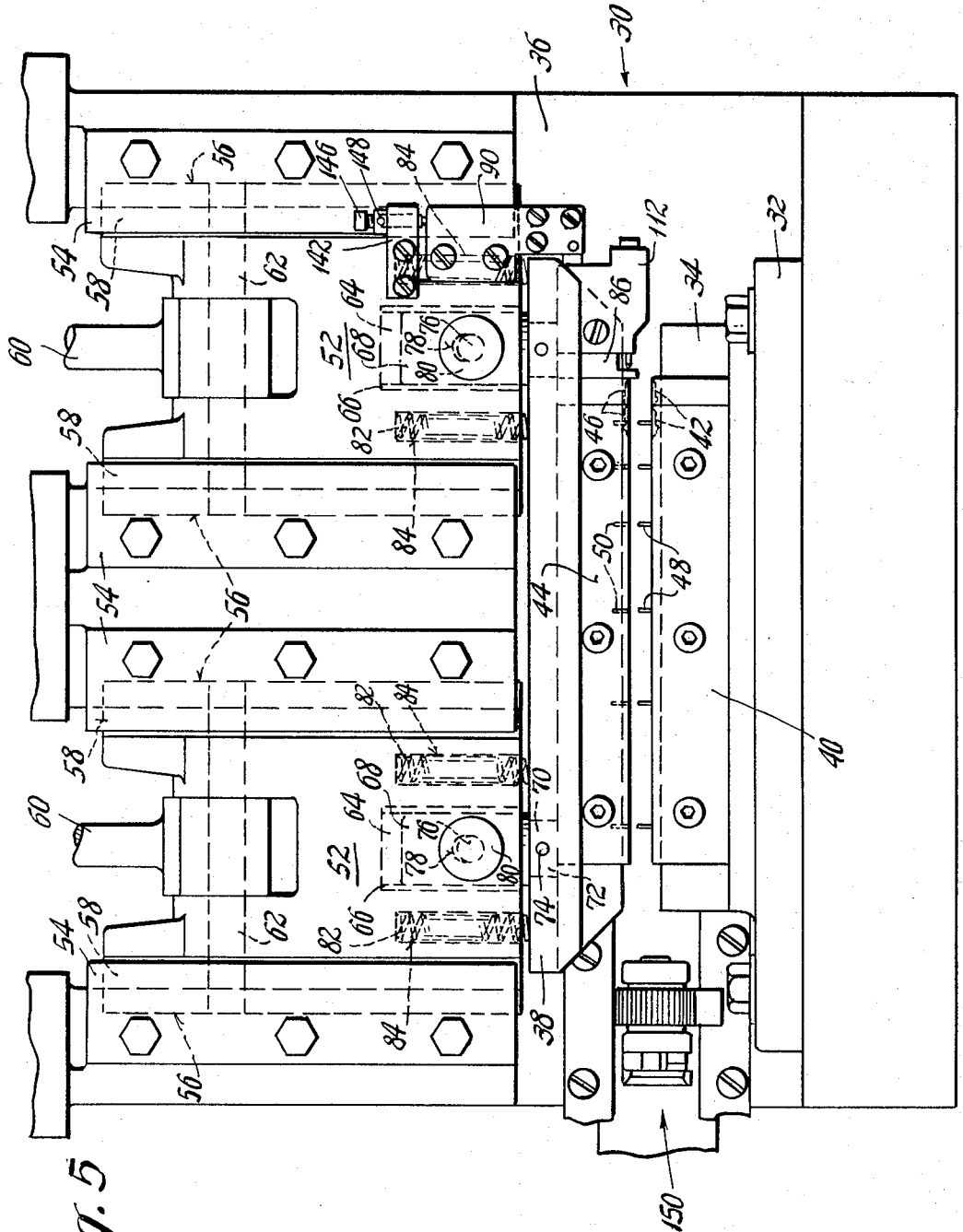

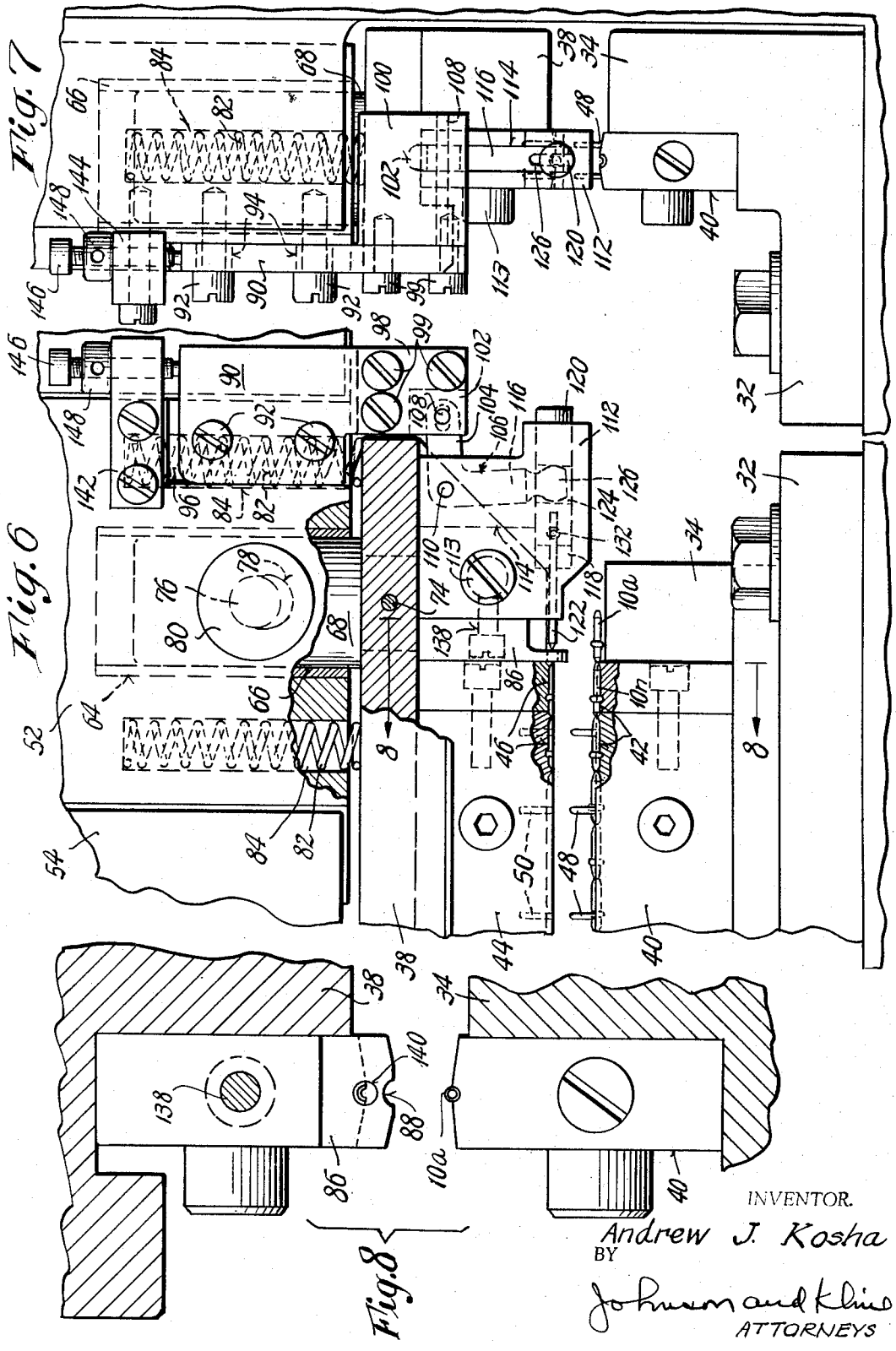

3,354,854
METHOD AND APPARATUS FOR MAKING ELECTRIC CONTACT PINS
Andrew J. Kosha, Stratford, Conn., assignor to The Bead Chain Manufacturing Company, Bridgeport, Conn., a corporation of Connecticut
Filed Apr. 26, 1965, Ser. No. 450,967
17 Claims. (Cl. 113—119)

This invention relates to a method for making tubular metallic articles and the article formed thereby, and more particularly to a method for making tubular electric contact pins for a variety of applications in the electric and electronic arts.

A principal object of this invention is to provide a novel method for making tubular electric contact pins in which internal obstructions to the passage of an electric wire through the pin, such as burrs, are eliminated.

Another principal object of this invention is to provide a novel apparatus for making tubular electric contact pins having a smooth internal surface free of obstructions, such as burrs, to the wire passing therethrough.

Contact pins of the character hereinafter described are conventionally applied to the terminal fittings of electric and electronic articles such as fluorescent light bulbs, vacuum tubes, condensers, resistors, transistors, connectors, and other like utility articles, for the purpose of retaining the articles in appropriate receptacles, and also for the purpose of making electrical contact with the internal contact members of such receptacles. To facilitate the latter function, a conducting wire is inserted in the contact pin from the rear end thereof, or the end adapted to be attached to or embedded in the terminal fitting of a desired utility article. This is customarily done by the end fabricator of the utility article after the contact wire has been secured to the article by means of high speed automated pin feeding and welding machines. The wire is connected by soldering or welding to the forward or projecting end of the pin, and extends rearwardly into the terminal fitting to which the pin is attached.

Great difficulty in the form of wire bending and poor connecting has been encountered in inserting the contact wire into the pin far enough to extend the end of the wire to the exterior of the forward end of the pin so as to permit proper soldering or welding of the two elements together. This difficulty has been found to arise as a result of internal obstructions in the form of burrs which are disposed around the terminal edge of the pin and which project inwardly into the path of the wire as the latter moves to its final position in the pin. Thus, when the end of the wire contacts a burr, the movement of the wire is abruptly halted which causes the wire to bend and kink, either inside or outside of the pin, with the result that the wire cannot be properly positioned in the pin for soldering or welding, and it will not extend from the rear end of the pin in proper straight alignment to permit severing from the wire supply. Also, there is the possibility that bending of the wire adjacent the outside one pin prevents the feed mechanism of the welding or soldering machine from properly inserting the wire into succeeding pins with the result that the feeding mechanism jams up with bent wire and the entire assembly operation must be stopped. Also, the presence of burrs, either internal or external, prevents a uniform and homogeneous soldered or welded connection of the wire to the pin.

In the manufacturing process of these pins, a conventional and necessary step is a tumbling operation, the principal function of which is to clean and polish the pins, but which also serves to remove external burrs from the forward ends of the pins. Thus in carrying out this process, a hollow tubular metal stock member is subjected to a series of shaping operations to form a plurality of individual but joined embryonic contact pins in various stages of formation. This forming operation takes place continuously as the tube stock is intermittently fed through a series of forming dies, and the finished end pins are severed from the strip in coordination with the intermittent feeding as they emerge from the final die. The severing, which is usually accomplished by shearing or breaking at the forward end of a tapered portion of each pin where adjacent pins connect, results in external burrs being left on the pins around the terminal edges of the tapered portions. These burrs are undesirable and troublesome in further assembly procedures. Accordingly, the severed pins are subjected to the aforementioned tumbling operation which is intended to bend the burrs outwardly of the terminal edges and break them off by violent contact with other pins, or with other material such as pebbles, metal pellets, marbles, etc., which may be included in the tumbling bin, thereby eliminating the burrs and leaving a smooth edge.

I have discovered, however, that the foregoing tumbling operation is the cause of the troublesome internally extending burrs for the reason that a substantial portion of the external burrs are not removed in the tumbling operation but rather are bent inwardly to project into the internal hollow space of the pins and hence into the path of movement of the conducing wire therethrough. This results from the fact that the burrs initially project substantially longitudinally of the pin, and contact therewith by other pins or material in the tumbling operation, or in tumbling or agitation incident to hopper feeding, or any other subsequent handling such as packing and shipping, tends more toward bending the burrs inwardly rather than outwardly. While many of the burrs do break off even in bending inwardly, a considerable number do not, and those that do not constitute the source of the difficulty encountered in properly inserting the conducting wire into the pins.

The present invention obviates the foregoing difficulty and eliminates the cause thereof without sacrificing the advantages derived from the tumbling operation. I have found that surprisingly good burr removal is obtained during tumbling if an expanding force is applied to the terminal edge of the pin so that it is slightly expanded by a proper amount and at a proper angle to the longitudinal axis of the pin. By such expansion, the burrs are flared outwardly by an amount sufficient to cause them to be bent still further outwardly during the tumbling operation rather than being bent inwardly thereby which results in the burrs being more and more exposed to the breaking action of violent contact with adjacent pins. This results in substantially all of the burrs being removed during tumbling and the pin emerging from the tumbling with the interior surface thereof smooth and completely free of any obstructions to the passage therethrough of the conducting wire.

Accordingly a more specific object of the present invention is to provide a method of making tubular electric contact pins in which undesirable internal burrs are removed from the pin without loss of the beneficial results obtained by the step of the manufacturing process which causes the internal burrs.

Still another object of the present invention is to provide an improved method of making tubular electric contact pins in which an additional step is provided to so alter the characteristics of the external burrs formed during processing of the pins that a subsequent processing step which tended to cause the burrs to turn inwardly now entirely removes them.

Another object of the present invention is to provide an apparatus for achieving the foregoing objects which utilizes the existing relative motion between two elements of prior apparatus to supply the driving force for novel construction added to the prior apparatus.

Further objects and advantages of the invention will become more apparent from a consideration of the following detailed description when considered in conjunction with the accompanying drawings in which:

FIGURE 1 is a longitudinal sectional view of an electric contact pin illustrating the condition of the terminal end of the pin at an intermediate stage in the manufacturing process, i.e. after formation but before tumbling;

FIG. 2 is a view similar to FIG. 1 illustrating the terminal end of the pin after tumbling, and illustrating the effect of internal burrs on a contact wire being inserted into the pin before soldering or welding.

FIG. 3 is a view similar to FIG. 1 illustrating the condition of the terminal end of the pin at the same intermediate stage in the manufacturing process, but with the pin fabricated in accordance with the principles of this invention;

FIG. 4 is a view similar to FIG. 1 illustrating the condition of the terminal end of the pin after tumbling when fabricated in accordance with the present invention, and illustrating a contact wire properly inserted in the pin and ready for connection thereto.

FIG. 5 is a fragmentary side elevation of an apparatus used in carrying out the method of this invention;

FIG. 6 is a fragmentary enlarged partially sectional elevation of the apparatus of FIG. 6;

FIG. 7 is an end elevation of the apparatus illustrated in FIG. 6;

FIG. 8 is a sectional view taken on the line 8—8 of FIG. 6; and

FIG. 9 is an enlarged view of the pin and expansion tool employed in the fabricating method of this invention.

Referring now to the drawings, and particularly to FIGS. 1-4 thereof, there is illustrated an elongate tubular electric contact pin 10 having a front end 12 and rear end 14, with an enlarged diameter annular protrusion 16 dividing the pin 10 into a forward portion 18 and a rearward portion 20. The rearward portion 20 is adapted to be embedded or staked into the terminal fitting 21 of any desirable electric or electronic component, such as a fluorescent light bulb, vacuum tube, condenser, resistor, transistor, wire connector, or other similar utility article which is intended to be electrically connected to another article or component. The forward end 18 is adapted to project from the aforementioned end fitting and be received in a suitable receptacle (not shown) of an article or component to which the article having the end fitting is to be connected. The forward portion 18 is provided with a tapered terminal portion 22 to facilitate soldering or welding of the contact wire to the pin and insertion of the pin into a receptacle.

As best seen in FIG. 4, a contact wire 24 is inserted into the pin 10 by the end fabricator of the utility article for making electric contact between the pin and the internal circuitry parts of the utility article. The wire 24 is inserted from the rear end 14 of the pin by appropriate pin feeding and welding mechanism (not shown) into which the pins are fed and held, the wire being advanced in the pin until the end thereof is substantially flush with, or projects slightly beyond, the front end 12 of the pin 10. Immediately thereafter, an appropriate welding or soldering device welds or solders the end of the wire to the front end of the pin, the projecting portion of the wire being severed before or after welding as desired. Customarily the wire feeding, welding or soldering, and severing are all accomplished by a single high speed automated wire and pin assembling machine of which many such machines are well known in the art.

FIGS. 1 and 2 illustrate one of the major difficulties encountered in the foregoing end fabrication of the utility article, this difficulty arising as the result of an important step in the fabrication of the pin 10. Conventionally, the pin is fabricated by intermittently feeding a tubular strip of pin stock of indefinite length into a die press (more fully described hereinafter) having a plurality of die cavities which successively form the pin in stages, and, at any one time, is working on a plurality of individual but joined embryonic pins in various stages of formation. At each successive advancement of the strip through the die press, the end finished pin is severed or knocked off by appropriate mechanism, which leaves burrs 26 projecting outwardly from the front end 12 of of the pin. These burrs are undesirable for many reasons and are customarily removed by subjecting the pins to a tumbling operation in which many pins, either alone or preferably with foreign material such as metal pellets or shot, pebbles, marbles, wood chips, etc., are violently agitated, the burrs being broken off by the violent contact thereof with other pins or the foreign material.

It has been discovered that the tumbling operation does not remove a substantial portion of the forwardly projecting burrs 26 but rather bends them inwardly, as at 26a in FIG. 2, to project into the otherwise open end of the pin, thereby partially closing the open end 13, in some cases, to an effective diameter less than the diameter of the wire 24. Upon insertion of the wire as described above, the end of the wire tends to hang up on a burr before the end of the wire reaches the desired location adjacent the front end 12 of the pin, with the result that the wire bends or kinks, either within or outside of the pin, and frequently jams up in the feeding mechanism of the connecting apparatus and necessitates a shutdown of the end fabrication operation as well as causing wastage of parts as a result of defective end fittings.

This difficulty, as well as others, is obviated by the improved pin fabricating method of this invention in which an expanding or bending force is applied to the free end of the pin prior to being severed from the embryonic strip. As seen in FIG. 3, the effect of this force is to bend the burrs 26 radially outwardly, as shown at 26b, which increases the likelihood of their being broken off in the subsequent tumbling operation to the point where substantially all of the burrs are removed, and prevents their being bent back inwardly. The result, as seen in FIG. 4, is a contact pin having a smooth front end 12b with no internal obstructions to the passage of the wire 24 therethrough. Also, since the heading operation is performed with a smooth cylindrical shouldered tool more fully described below, the end 12b of the pin is smooth and square as compared with the ragged and irregular front end 12a illustrated in FIG. 2. This results in the end fabricator being able to feed his welding or soldering machines more easily and accurately, and also results in a more uniform and homogeneous weld or solder connection being obtained.

The method of the present invention is conveniently carried out by the apparatus illustrated in FIGS. 5-9, and which comprises a frame 30 having a horizontal portion 32 to which a lower fixed die holder 34 is suitably secured, and an upstanding portion 36 for supporting and guiding an upper die holder 38 for vertical reciprocatory movement. The lower die holder 34 fixedly supports a lower die block 40 having a plurality of die cavities 42 which conform to one half of the desired contour of the pins. Although only two die cavities 42 have been illustrated, it will be understood that there are a plurality of such cavities in the die block in accordance with the number of forming stages.

An upper die block 44 is suitably secured to the upper die holder 38 for movement therewith, and is provided with a plurality of die cavities 46 which correspond in number and contour to the die cavities 42 provided in the lower die block 40. A plurality of guide pins 48 formed on the lower die block 40 engage recesses 50 in the upper die block 44 to assure proper registration of the die blocks when they engage.

The driving mechanism for reciprocating the upper die holder 38 comprises one or more gates 52 movably carried and guided for vertical reciprocatory movement by guide blocks 54 having channels 56 in which extensions 58 of the gates 52 are located, the guide blocks 54 being suitably secured to portions of the upstanding frame portion 36. The gates are connected to drive shafts 60 by any suitable pin connections 62 so that the shafts 60 may oscillate relative to the gates 52 when the former are reciprocated up and down as by a crank shaft or eccentric as is well known in the art.

The driving mechanism carries one of the die blocks for simultaneous movement therewith over one portion of its movement and for relative movement with respect thereto over another portion of its movement. Each gate 52 is provided with a downwardly opening bore 64 having a hardened bushing 66 disposed therein, the bushing slidingly receiving a post 68 which extends slightly beyond the bottom of the gate 52 and terminates in a reduced diameter portion 70 which is received with a bore 72 formed in the upper die holder 38 and connected thereto as by pin 74. Each post 68 is removably connected to the gate 52 for limited relative movement therebetween by a suitable pin or bolt 76 which is carried by the gate and which passes through elongate openings 78 formed in the post 68. A knob 80 on each pin 76 facilitates removal of the latter.

The upper die holder 38, and the parts carried thereby, are normally urged out of contact with the gates 52 by a plurality of springs 82 received in suitable bores 84 formed in the gates 52, the springs bearing on the upper surface of the upper die holder 38. In a die forming operation, as the gates 52 are moved downwardly by the shafts 60, the upper die holder 38 moves with the gates 52 and remains spaced from the bottom of the gates until the upper die block 44 comes into firm contact with the strip of embryonic pins disposed in the lower die block 40. The gates then continue to move downwardly relative to the upper die holder while compressing the springs 82 until the gates hit the upper surface of the upper die holder 38 in the manner of a ram with sufficient impact to force the upper die block 44 downwardly the last small increment of movement necessary to close the die blocks 40 and 44 and effect the forming of the pin strip in the die cavities. The gates are then raised, the pin strip advanced one stage and the above cycle is repeated. It is apparent that there is both simultaneous movement and relative movement of the gates and die block during both strokes of the apparatus.

As best seen in FIGS. 6, and 8, a severing element 86 is mounted as more fully described hereinafter on the upper die holder 38 for movement therewith and is provided with a severing surface 88 which contacts an ejected finished pin, such as that indicated 10a in FIG. 6, as it descends with the upper die holder 38 to sever or knock off this end pin from the strip of partially formed pins just before the die blocks 40 and 44 close to effect another forming operation. Thus as the gates 52 and upper die holder 38 and die block 44 descend at the beginning of a forming cycle, the end pin formed to the finished configuration in a previous cycle of operation is knocked off as an incident of the commencement of a subsequent cycle of operation. It is this severing or knock off step performed by the severing member 86 which results in the forwardly projecting burrs 26 as seen in FIG. 1 being left on the forward terminal edge of each pin, and which are thereafter bent inwardly into the path of the contact wire 24 as a result of the aforementioned tumbling operation.

In accordance with one object of the present invention, means are provided for forcibly engaging the open free end of the pin and applying an expanding force to the forward or free terminal edge of the pin held in the final forming die cavities, this means being mounted on both the driving means, the upper die holder carried thereby, and being responsive to the relative movement between the die holder and gate during the final downward movement of the latter to effect reciprocating movement of a flaring or expanding tool suitably carried by the upper die holder. As best seen in FIGS. 6 and 7, a plate 90 is adjustably secured to the front face of one of the gates 52 as by threaded bolts 92 being received through elongate openings 94 in the plate 90 and being threadedly received into the gate 52. The plate 90 is mounted for limited vertical movement on a recessed portion 96 of the gate 52. The plate 90 has an elongate extension 98 projecting downwardly beyond the bottom of the gate 52 which fixedly carries, as by bolts 99, a block 100, the latter being provided with a groove 102 adjacent one corner for pivotally mounting the short leg 104 of a bell crank 106 as by a pin 108. The bell crank 106 is pivotally connected as by another pin 110 to the upper portion of another block 112 which is connected to the upper die holder 38 by the bolt 113, and which has a vertical channel 114 formed therein for receiving the other longer leg 116 of the bell crank 106. The vertical channel 114 communicates with a horizontal bore 118 formed in the lower portion of the block 112, the bore 118 movably receiving a reciprocating driver 120 for removably carrying one end of a flaring or expanding tool 122. The driver 120 has a reduced diameter midportion 124, and the leg 116 of the bell crank 106 terminates in a bifurcated ball element 126 which fits within the space defined by the full diameter portions of the driver 120 and surrounds the reduced diameter portion 124 in order to reciprocate the driver 120 horizontally as the bell crank 106 pivots about the pin 110 in response to downward movement of the block 100 as described more fully hereinafter.

The expanding tool 122, as best seen in FIG. 9 comprises a shank 128 having an end fitting 130 which is received in a bore in the driver 120 and removably secured therein as by a set screw 132. The other end of the tool 122 is provided with a pointed head 134 which is connected to the shank 128 by a radius portion 136 of reverse curvature from that of the tip 134. As best seen in FIG. 3, forcible engagement of the tool 122 with the open forward end 12 of the pin causes the burrs 26 to be bent outwardly as at 26b and also causes the extreme terminal edge of the pin to be expanded slightly outwardly resulting in an outward flare of the terminal edge as indicated by 12c in FIG. 4 after the pins have been tumbled and the burrs 26b removed.

As indicated above, the severing member 86 is carried by the upper die holder 38 by means of being secured to the block 112 as by the bolt 138. Therefore the severing member 86 moves with the upper die holder and the tool 122 during the initial portion of movement of the gates 52 when the latter and the upper die holder 38 move simultaneously. In order to permit the tool 122 to engage the pin through the second or relative portion of movement of the gates 52 and the upper die holder 38, the severing element 86 is provided with an aperture 140 disposed in axial alignment with the tool 122 and which, together with the tool 122, will be in axial alignment with the pin 10n in the final forming die when the upper die block 44 is engaged with the lower die 40 to effect another forming operation. At this time the ejected pin 10a will have been knocked off the pin strip by the severing surface 88.

In order to facilitate the application of this invention to pins of different diameter as well as to permit variation of the extent of expansion of the pin ends, means are provided for adjusting the terminal position of the tool 122 when it is in engagement with the end of a pin in the final die forming stage. This means comprises a block 142 suitably secured to the gate 52 and having a portion 144 overlying the plate 90, the portion 144 threadedly receiving an adjusting screw 146 which can be adjustably locked to the plate 142 by means of a lock nut 148. By slightly loosening the bolts 92, the plate 90 can be adjusted upwardly or downwardly within the limits of the elongated holes 94 and with accurate control by minute rotations of the screw 146 thereby altering the terminal positions of the expanding tool 122. After positioning the tool at the desired point, the screws 92 are retightened and the tool 122 will thereafter reciprocate within the same fixed limits.

Referring to FIG. 5, the apparatus is provided with any suitable feeding device generally designated by the numeral 150, this device customarily being effective to intermittently feed an indefinite length of tubular stock material between the die blocks 40 and 44 in timed coordination with the operation of the die forming apparatus and while the die blocks are disengaged, and simultaneously with each intermittent movement to eject a finished pin 10a from the other end of the die blocks 40 and 44. Since this device is well known in the art, no further description thereof is believed necessary.

In a complete cycle of the above described apparatus, and with the parts as illustrated in FIG. 5, the feeding device 150 advances the strip of embryonic pins by one die forming stage and simultaneously ejects a finished pin 10a beyond the die blocks 40 and 44. As the gates 52 descend with the upper die holder 38 and all the parts connected thereto, the severing edge 88 of the member 86 contacts the pin 10a and severs it from the strip at about the same time that the upper die block 44 engages the strip of embryonic pins or very slightly in advance thereof. Thereafter the gates 52, together with the plate 90 and the block 100, continue to move downwardly, compressing the springs 82 and pivoting the bell crank 106 about the pivot point 110, thereby moving the driver 120 and the expanding tool 122 toward the left as viewed in FIG. 6 to bring the tip 134 of the expanding tool into firm engagement with the free end of the pin 10b, the tool passing through the aperture 140 of the severing member 86. When the gates 52 forcibly strike the upper surface of the upper die holder 38, this force is transmitted to the upper die block 44 to effect the last minute movement thereof necessary to produce the extent of forming in each of the successive die forming stages. On the return stroke of the gates 52, the tool 122 is withdrawn from the pin 10b as the relative movement of the gates 52 and the upper die holder 38 takes place in response to the force of the springs 82, whereupon continued upward movement of the gates 52 fully disengages the die blocks 40 and 44 to permit the feeding device 150 to feed the strip another pin length whereupon the foregoing cycle is repeated.

From the foregoing, it is apparent that there has been provided a method for making tubular electric contact pins in which, by a novel additional step to a known method, the beneficial results of a partially troublesome step of the known method are retained, and in addition this step is utilized to more effectively achieve a contact pin which is completely free of internally projecting burrs. In addition, there is provided an apparatus in which inherent relative movement between a movable die portion and a driving means therefor in conventional apparatus is utilized to provide the driving force for a novel device which is interconnected with the movable die portion and the driving means for applying an expanding force to the terminal edge of a pin to cause any burrs thereon to be bent outwardly thereof while the pin remains in the forming apparatus.

It is to be understood that the form of the invention disclosed herein is merely illustrative of the principles thereof, and the invention is intended to cover such modifications and equivalents thereof as may be deemed to be within the scope of the appended claims.

What I claim is:

1. In the method of making elongate tubular electric contact pins having opposite open ends for receiving a contact wire therethrough in which a pin of predetermined configuration is die formed in an indefinite length of tubular stock material, and subsequently is severed from the stock material and has burrs protruding from one end of the pin formed by the severing of a preceding pin while said pin was being formed in the stock material, which burrs are liable to be bent inwardly of the pin into the path of the contact wire as a result of contact with other objects during subsequent handling to an extent which prevent free passage of the contact wire through the pin, the improvement comprising the step of applying an expanding force to said one end of the pin prior to said subsequent handling to cause any existing burrs to be flared outwardly of the pin and thereby prevented from being bent inwardly into the path of the contact wire during said subsequent handling.

2. In the method of making elongate tubular electric contact pins having opposite open ends for receiving a contact wire therethrough in which a plurality of embryonic pins are die formed in stages to form an end pin of predetermined finished configuration in an indefinite length of tubular stock material, and the finished end pin is severed from the stock material and has burrs protruding from the free end of the next adjacent pin formed in the stock material, which burrs are liable to be bent inwardly into the path of the contact wire as a result of contact with other objects during subsequent handling to an extent which would prevent free passage of the contact wire through the pin, the improvement comprising the step of applying an expanding force to the free end of the finished end pin on said strip prior to said finished end pin being severed from said strip to cause any existing burrs to be flared outwardly of the pin and thereby prevented from being bent inwardly into the path of the contact wire during said subsequent handling.

3. In the method of making elongate tubular electric contact pins having opposite open ends for receiving a contact wire therethrough in which a plurality of embryonic pins are die formed to a predetermined finished configuration in stages in an indefinite length of tubular stock material, and the finished end pin is subsequently severed from the stock material and has burrs protruding from the free end of the next adjacent pin formed in the stock material, and a plurality of such finished pins are subjected to violent agitation during which some of the burrs are broken off and others are liable to be bent inwardly of the pin into the path of the contact wire as a result of contact with other pins during said agitation to an extent which would prevent the free passage of the contact wire through the pin, the improvement comprising the step of applying an expanding force to the longitudinal terminal edge of the free end of the finished end pin on the stock material before said finished end pin is severed from the strip to cause any existing burrs to be flared outwardly of the pin and thereby further exposed to the breaking action of violent contact during said agitation and prevented from being bent inwardly into the path of the contact wire during said agitation.

4. In the method of making elongate tubular electric contact pins having opposite open ends for receiving a contact wire therethrough in which a plurality of embryonic pins are die formed to a predetermined finished configuration in stages in an indefinite length of tubular stock material as the same is intermittently advanced past a plurality of forming stations and in which the finished end pin is subsequently severed from the stock material after said finished end pin is ejected from the final forming stage and has burrs protruding from the free end of the next adjacent pin remaining in the final forming stage, and a plurality of such finished pins are subjected to violent agitation during which some of the burrs are broken off and others are liable to be bent inwardly of the pin into the path of the contact wire as a result of contact with other pins during said agitation to an extent which would prevent the free passage of the contact wire through the pin, the improvement comprising the step of applying an expanding force to the longitudinal terminal edge of the free end of the finished end pin prior to its being ejected from the final forming die for severing from the stock material to cause any existing burrs on the longitudinal free edge of the finished pin to be flared outwardly thereof and thereby prevented from being bent outwardly into the path of the contact wire during said agitation.

5. A method of making electric contact pins adapted to receive a contact wire therethrough comprising the steps of sequentially forming in stages a plurality of elongate individual but joined embryonic contact pins in a hollow tubular metal stock member of indefinite length to form a finished end pin of predetermined configuration on said stock member, applying an expanding force to the longitudinal terminal edge of said end pin to cause any existing burrs on said edge resulting from the severing of a previous pin from said end pin to be flared outwardly of said terminal edge and prevented from being bent inwardly of the pin into the path of a contact wire during subsequent handling of the pin, and severing said end pin from said stock member.

6. A method of making electric contact pins adapted to receive a contact wire therethrough comprising the steps of sequentially forming in stages a plurality of elongate individual but joined embryonic contact pins in a hollow tubular metal stock member of indefinite length to form a finished end pin of predetermined configuration on said stock member, applying an expanding force to the longitudinal terminal edge of said end pin to cause any existing burrs on said edge resulting from the severing of a previous pin from said end pin to be flared outwardly of said terminal edge, severing said end pin from said stock member, and subjecting said severed pin to violent agitation with a plurality of such pins whereby said outwardly flared burrs are bent further outwardly and substantially completely removed from said terminal edge.

7. A method of making electric contact pins adapted to receive a contact wire therethrough comprising the steps of sequentially forming in stages a plurality of elongate individual but joined embryonic contact pins in a hollow tubular metal stock member of indefinite length by intermittently feeding said stock member through a series of forming dies to form a finished end pin of predetermined configuration on said stock member, applying an expanding force to the longitudinal terminal edge of said end pin while said end pin is in the last of said forming dies to cause any existing burrs on said edge resulting from the severing of a previous pin from said end pin to be flared outwardly of said terminal edge, severing said end pin from said stock member, and subjecting said severed pin to violent agitation with a plurality of such pins whereby said outwardly flared burrs are bent further outwardly and substantially completely removed from said terminal edge.

8. A method of making electric contact pins adapted to receive a contact wire therethrough comprising the steps of sequentially forming in stages a plurality of elongate individual but joined embryonic contact pins in a hollow tubular metal stock member of indefinite length by intermittently feeding said stock member through a series of forming dies to form a finished end pin of predetermined configuration on said stock member, applying an expanding force to the longitudinal terminal edge of said end pin while said end pin is in the last of said forming dies to cause any existing burrs on said edge resulting from the severing of a previous pin from said end pin to be flared outwardly of said terminal edge, severing said end pin from said stock member after said stock member has advanced one pin length to remove said end pin from said last forming die, and subjecting said severed pin to violent agitation with a plurality of such pins whereby said outwardly flared burrs are bent further outwardly and substantially completely removed from said terminal edge.

9. A method of making electric contact pins adapted to receive a contact wire therethrough comprising the steps of intermittently feeding a hollow tubular metal stock member of indefinite length through a plurality of serially arranged forming dies operable to sequentially form in stages a plurality of elongate individual but joined embryonic contact pins and a finished end pin of predetermined configuration, sequentially forming in stages said contact pins in coordination with periods of dwell in said intermittent feeding, successively applying an expanding force to the longitudinal terminal edges of the finished end pins on said stock member in coordination with said periods of dwell in said intermittent feeding and while said end pins are in the last of said forming dies, to cause any existing burrs on said edges resulting from the severing of previous pins to be flared outwardly of said terminal edges, successively severing said finished end pins from said stock member after said pins emerge from said last forming die and in coordination with said periods of dwell in said intermittent feeding, and subjecting a plurality of said severed pins to a tumbling operation whereby said outwardly flared burrs are bent further outwardly and substantially completely removed from said terminal edges.

10. Apparatus for making elongate tubular electric contact pins having opposite open ends for receiving a contact wire therethrough, said apparatus comprising releasably engageable die forming means for receiving an indefinite length of tubular stock material and for forming therein a pin of given length and predetermined shape, movable driving means for engaging and disengaging said die forming means, said driving means including means for carrying a portion of said die forming means for simultaneous movement with said driving means over one portion of movement of said driving means, and for relative movement with respect to said driving means over another portion of movement of said driving means, and means carried by both said driving means and said movable die portion and responsive to said relative movement therebetween for forcibly engaging the open free end of said pin and applying an expanding force to the longitudinal terminal edge thereof to cause any existing burrs projecting from said terminal edge to be bent outwardly and prevented from being bent into the path of a contact wire.

11. Apparatus as set forth in claim 10 wherein said means for engaging and applying an expanding force to the longitudinal terminal edge of said pin comprises a shaping tool carried by said movable die portion for reciprocating movement in the direction of the longitudinal axis of said pin, said tool having an outwardly flared tip adapted to enter said pin, and actuating means cooperable between said tool and said driving means and responsive to said relative movement between said driving means and said movable die portion for causing said reciprocating movement of said tool into and out of engagement with said terminal edge of said pin.

12. Apparatus as set forth in claim 11 wherein said actuating means comprises a bell crank pivotally carried by said movable die portion and being pivotally connected to said tool and said driving means whereby said relative movement between said driving means and said movable die portion carried thereby causes said bell crank to oscillate and to reciprocate said tool.

13. Apparatus as set forth in claim 10 wherein said means for engaging and applying an expanding force to the longitudinal terminal edge of said pin comprises a shaping tool carried by said movable die portion and movable therewith over said one portion of movement of said driving means into axial alignment with said pin, said tool being mounted in said movable die porton for reciprocating movement in the direction of the longitudinal axis of said pin, said tool having an outwardly flared tip adapted to enter said pin, and actuating means having a portion mounted on said movable die portion and movable therewith over said one portion of movement of said driving means, said actuating means having another portion connected to said driving means and cooperable with said tool over said other portion of movement of said driving means to cause said reciprocating movement of said tool into and out of engagement with said terminal edge of said pin.

14. Apparatus as set forth in claim 13 wherein said other portion of said actuating means is adjustably connected to said driving means for limited movement in the direction of movement of said driving means whereby the extent of penetration of the tip of said tool within said pin may be adjusted to vary the amount of expanding force applied to said terminal edge.

15. Apparatus for making elongate tubular electric contact pins having opposite open ends for receiving a contact wire therethrough, said apparatus comprising releasably engageable die forming means for receiving an indefinite length of tubular stock material and for forming therein a pin of given length and predetermined shape, means for intermittently feeding said stock material into said die forming means and simultaneously ejecting a finished pin out of said die forming means when the latter are disengaged, movable driving means for engaging and disengaging said die forming means, said driving means including means for carrying a portion of said die forming means for simultaneous movement with said driving means over one portion of movement of said driving means, and for relative movement with respect to said driving means over another portion of movement of said driving means, and means carried by both said driving means and said movable die portion and responsive to said relative movement therebetween for forcibly engaging the open free end of a pin held by said die forming means and applying an expanding force to the longitudinal terminal edge thereof prior to ejection of said pin from said die forming means by said feeding means to cause any existing burrs projecting from said terminal edge to be bent outwardly and prevented from being bent into the path of a contact wire.

16. Apparatus for making elongate tubular electric contact pins having opposite open ends for receiving a contact wire therethrough, said apparatus comprising releasably engageable die forming means for receiving an indefinite length of tubular stock material and for forming therein a pin of given length and predetermined shape, means for intermittently feeding said stock material into said die forming means and simultaneously ejecting a finished pin out of said die forming means when the latter are disengaged, movable driving means for engaging and disengaging said die forming means, said driving means including means for carrying a portion of said die forming means for simultaneous movement with said driving means over one portion of movement of said driving means, and for relative movement with respect to said driving means over another portion of movement of said driving means, severing means carried by said movable die portion and operable to sever said finished ejected pin from said stock material during the simultaneous movement of said driving means and said movable die portion, and means carried by both said driving means and said movable die portion and responsive to said relative movement therebetween for forcibly engaging the open free end of a pin held by said die forming means and applying an expanding force to the longitudinal terminal edge thereof prior to ejection of said pin from said die forming means by said feeding means but subsequent to the severing of a previously ejected finished pin from said stock material to cause any existing burrs projecting from said terminal edge as a result of the severing of a previously ejected finished pin to be bent outwardly and prevented from being bent into the path of a contact wire.

17. Apparatus as set forth in claim 16 wherein said severing means comprises a plate having a severing edge thereon positioned to contact said finished ejected pin and knock the same off of said stock material during said simultaneous movement of said driving means and said movable die portion, said plate being provided with an aperture positioned to be disposed in axial alignment with said stock material when said die forming means are engaged, and wherein said means for engaging and applying an expanding force to the longitudinal terminal edge of said pin held by said die forming means comprises a shaping tool carried by said movable die portion for reciprocating movement in the direction of the longitudinal axis of said pin, said shaping tool being positioned in axial alignment with said aperture in said severing plate and having an outwardly flared tip adapted to pass therethrough and enter said pin held by said die forming means, and actuating means cooperable between said tool and said driving means and responsive to said relative movement between said driving means and said movable die portion for causing said reciprocating movement of said tool into and out of engagement with said terminal edge of said pin held by said die forming means.

References Cited

UNITED STATES PATENTS

| | | | |
|---|---|---|---|
| 2,437,477 | 3/1948 | Parkin et al. | 113—119 |
| 2,494,137 | 1/1950 | Martines | 113—119 |
| 2,610,390 | 9/1952 | Locke | 29—155.55 |

RICHARD J. HERBST, *Primary Examiner.*